United States Patent
Havas et al.

(10) Patent No.: US 6,651,319 B2
(45) Date of Patent: Nov. 25, 2003

(54) COMPLIANT STANDOFF FOR LOW PRESSURE SENSING DEVICE

(75) Inventors: Donald W. Havas, Limerick, PA (US); Dean Carl Newswanger, Lebanon, PA (US); Walter B. Swankoski, Souderton, PA (US)

(73) Assignee: Visteon Global Technologies, Inc., Dearborn, MI (US)

( * ) Notice: Subject to any disclaimer, the term of this patent is extended or adjusted under 35 U.S.C. 154(b) by 151 days.

(21) Appl. No.: 09/949,188

(22) Filed: Sep. 7, 2001

(65) Prior Publication Data

US 2003/0047354 A1 Mar. 13, 2003

(51) Int. Cl.[7] .................................................. H05K 3/30
(52) U.S. Cl. ............................ 29/832; 29/831; 29/840; 29/842; 29/825
(58) Field of Search ......................... 29/840, 832, 829, 29/830, 842, 825, 831

(56) References Cited

U.S. PATENT DOCUMENTS

| | | |
|---|---|---|
| 5,483,106 A | 1/1996 | Echigo et al. |
| 5,543,585 A | 8/1996 | Booth et al. |
| 5,629,835 A | 5/1997 | Mahulikar et al. |
| 5,724,230 A | 3/1998 | Poetzinger |
| 5,931,371 A | 8/1999 | Pao et al. |
| 5,953,816 A * | 9/1999 | Pai et al. |
| 5,955,782 A * | 9/1999 | Kosteva et al. |
| 6,138,348 A * | 10/2000 | Kulesza et al. |
| 6,144,558 A | 11/2000 | Shiota et al. |
| 6,228,197 B1 * | 5/2001 | Wang |
| 6,409,866 B1 * | 6/2002 | Yamada |
| 6,426,566 B1 * | 7/2002 | Sawamoto |

OTHER PUBLICATIONS

WPI Abstract. Acc. No. 1992–251040 & DE 4101554 A (Bosch) —see diagrams and English language abstracts.
WPI Abstract. Acc. No. 1998–022801 & JP 9280986 A (Matsushita) —see diagrams and English language abstracts.
WPI Abstract. Acc. No. 1991–003876 & JP 2281113 A (Matsushita) —see diagrams and English language abstracts.

* cited by examiner

Primary Examiner—Carl J. Arbes
(74) Attorney, Agent, or Firm—Brinks Hofer Gilson & Lione

(57) ABSTRACT

A method for attaching a sensing device to a substrate at a pre-determined distance from the substrate is provided. The method preferably includes providing a compliant adhesive and depositing a first layer of the compliant adhesive onto the substrate, curing the first layer of the compliant adhesive, depositing a second layer of the compliant adhesive directly onto the first layer of the compliant adhesive, inserting the sensing device into the second layer of the compliant adhesive and curing the second layer of the compliant adhesive.

5 Claims, 2 Drawing Sheets

COMPLIANT STANDOFF FOR LOW PRESSURE SENSING DEVICE

TECHNICAL FIELD OF THE INVENTION

The present invention generally relates to a method of attaching a sensing device to a substrate and, more specifically, a method of attaching a sensing device to a substrate to allow relative movement between the sensing device and the substrate after the sensing device is attached.

BACKGROUND

Low pressure sensors such as fuel tank pressure transducers are typically mounted to the substrate to which they are attached in a way that will allow slight relative movement between the sensor and the substrate. This is due to the fact that sensors of this type are very sensitive to stresses and strains which can affect the accuracy of the sensor, or cause damage to the sensor. Additionally, in order for the sensor to operate correctly, the sensor must be mounted at a specific distance from the substrate. Conventional methods of mounting such sensors to a substrate include using complex equipment to maintain the sensor at a distance while the adhesive being used to mount the sensor cures, or by using time and pressure placement solutions which have low capability. One specific conventional method involves placing glass beads within a thermal adhesive to maintain a standoff distance between the sensor and the substrate during curing of the adhesive, however, there is a need in the industry for an improved method of attaching a sensing device, such as a fuel tank pressure transducer, to a substrate, such as the interior of an automobile gas tank, at a specific distance from the substrate.

SUMMARY OF THE INVENTION

In accordance with an aspect of the present invention, the method for attaching a sensing device to a substrate at a pre-determined distance from the substrate preferably includes providing a compliant adhesive, depositing a first layer of the compliant adhesive onto the substrate, curing the first layer of the compliant adhesive, depositing a second layer of the compliant adhesive directly onto the first layer of the compliant adhesive, inserting the sensing device into the second layer of the compliant adhesive, and curing the second layer of the compliant adhesive.

DETAILED DESCRIPTION OF THE PREFERRED EMBODIMENT

The following description of the preferred embodiment of the invention is not intended to limit the scope of the invention to this preferred embodiment, but rather to enable any person skilled in the art to make and use the invention.

Figure 1:
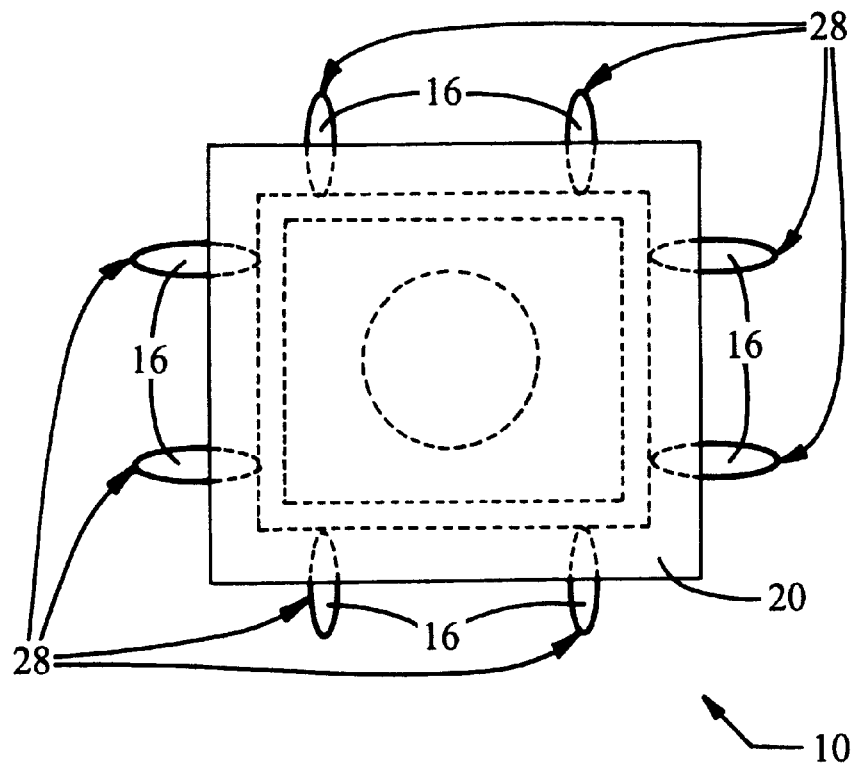
FIG. 1 is a top view of a sensing device of the present invention.
Figure 2:
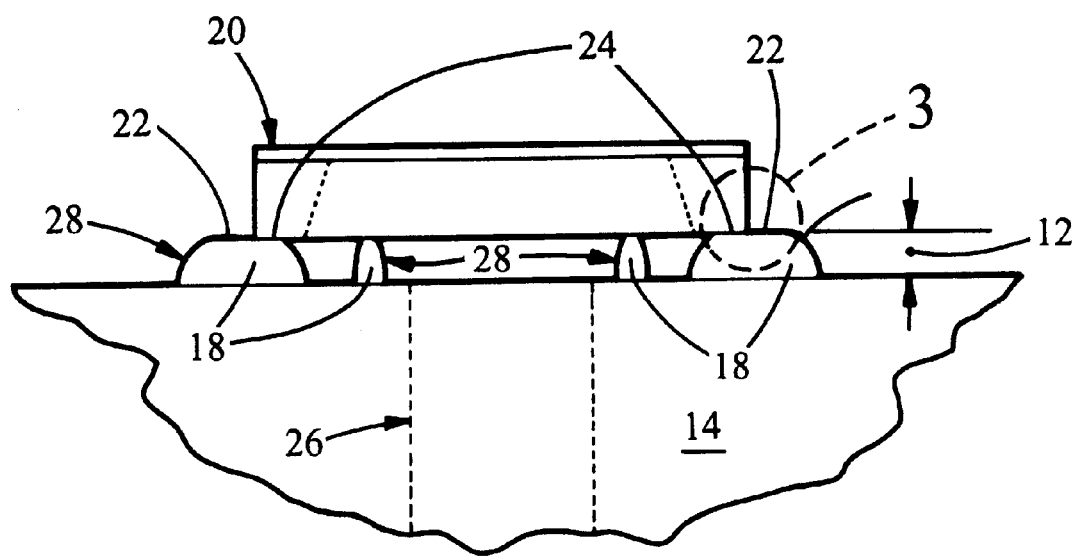
FIG. 2 is a side view of the sensing device of the present invention.
Figure 3:
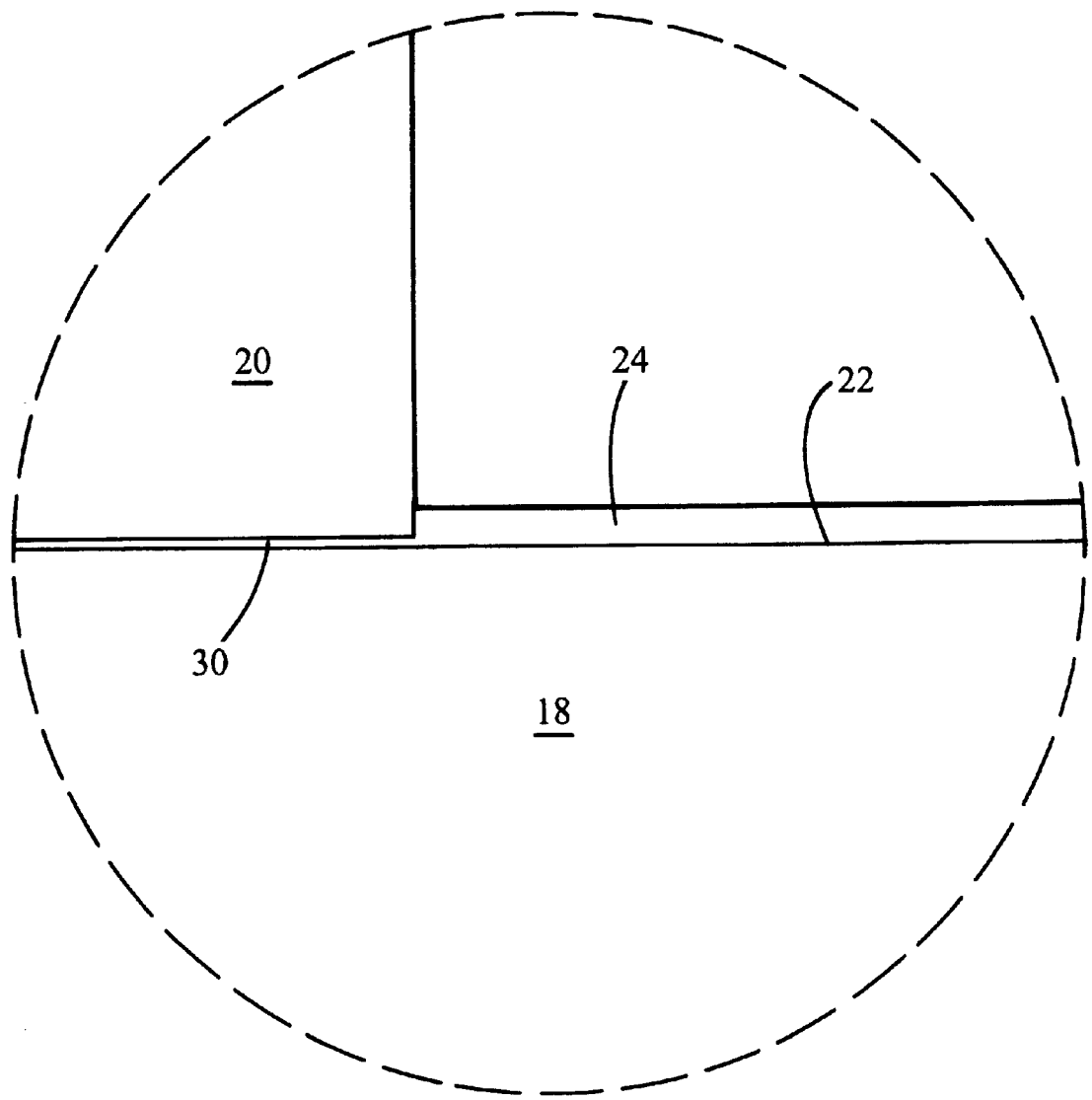
FIG. 3 is a detailed view of a portion of the sensing device shown in FIG. 2.

Referring to FIGS. 1 and 2, a sensing device of the present invention is shown generally at 10. A sensor 20 is attached at a pre-determined distance 12 from a substrate 14 with an compliant adhesive 16. A first layer 18 of the compliant adhesive 16 is attached to the substrate 14. Referring to FIG. 2, the first layer 18 of the compliant adhesive 16 has a thickness approximately equal to the pre-determined distance 12. The sensor 20 is attached to a top surface 22 of the first layer 18 of the compliant adhesive 16 by a second layer 24 of the compliant adhesive 16. Referring to FIG. 3, the second layer 24 of the compliant adhesive 16 is preferably thinner than the first layer 18 of compliant adhesive 16 and is positioned between the sensor 20 and the first layer 18 of compliant adhesive 16 to secure the sensor 20 to the top surface 22 of the first layer 18 of the compliant adhesive 16.

The compliant adhesive 16 can be any generally used adhesive that cures to a compliant, but solid composition. It is preferable for the adhesive 16 to be compliant due to the sensitivities of the sensors that may be mounted to the substrate 14. Pressure sensors and strain sensors are very sensitive to stresses and must be able to flex with respect to the substrate 14 or there is a risk of damaging the sensors 20.

In the preferred embodiment, the sensor 20 is a fuel tank pressure transducer which is mounted within the gas tank of an automobile. The fuel tank pressure transducer is mounted directly over a vapor port 26 to gage the pressure of the gasoline vapors in the tank. Due to the environment, the preferred compliant adhesive 16 is a silicon based, gasoline resistant, adhesive. This type of compliant adhesive 16 is common in the industry, and any suitable adhesive based upon the environment and the type of sensor 20 being used is appropriate.

Before the sensor 20 is applied to the substrate 14, an appropriate adhesive 16 is selected. As described above, compliant adhesives 16 are common in the industry, and an appropriate adhesive must be selected based upon the environment into which the sensor 20 is being mounted, and the type of sensor 20. The first layer 18 of the compliant adhesive 16 is deposited onto the substrate 14 and cured in place. In the preferred embodiment, the first layer 18 of the compliant adhesive 16 is deposited onto the substrate 14 through a screen printing process. A screen printing process is preferred because the screen printing process will allow the compliant adhesive 16 to be deposited onto the substrate 14 in a controlled manner. The screen printing process will also make it possible to control the thickness at which the first layer 18 of compliant adhesive 16 is applied, and will also allow the first layer 18 of compliant adhesive 16 to be deposited onto the substrate 14 in a specific pattern that is suitable for the particular sensor 20 and application. It is to be understood, however, that any method of depositing the compliant adhesive 16 that will allow the thickness of the layer being deposited to be controlled and will allow the adhesive 16 to be deposited in the desired pattern would be suitable.

Referring again to FIG. 1, in the preferred embodiment, the first layer 18 of compliant adhesive 16 is placed onto the substrate 14 in a pattern consisting of eight oblong segments 28. Referring to FIG. 2, each of the eight oblong segments 28 has a specific height, which is approximately equal to the pre-determined distance 12 at which the sensor 20 must be spaced from the substrate 14.

The adhesive 16 is preferably applied in a viscous state. After the first layer 18 of complaint adhesive 16 is deposited to the substrate 14, the compliant adhesive 16 is then cured. Once the adhesive 16 is cured, the first layer 18 of complaint adhesive 16 becomes solid. Although solid, the adhesive 16 remain compliant, in that the adhesive 16 will accommodate slight relative movement between the sensor 20 and the substrate 14 to prevent stresses from transferring from the substrate 14 to the sensor 20 and causing damage to the sensor 20.

It is to be understood, that the first layer 18 of the compliant adhesive 16 does not need to be completely cured before placing the sensor 20 on top of the first layer 18. When the compliant adhesive 16 is completely cured, the first layer 18 is solid throughout. The first layer 18 of compliant adhesive 16 need be cured only to a point where enough of the first layer 18 has solidified to support the pressure exerted upon the first layer 18 when the sensor 20 is attached thereto. It is not necessary that the first layer 18 is completely cured, only that the first layer 18 has cured to a point that will adequately support the sensor 20 and maintain the pre-determined distance 12.

After the first layer 18 of compliant adhesive 16 has been substantially cured, a second layer 24 of compliant adhesive 16 is applied to the top surface 22 of the cured first layer 18 of the compliant adhesive 16. Preferably, the second layer 24 is thinner than the first layer 18, as the purpose for the second layer 18 is only to provide an attachment between the sensor 20 and the first layer 18. The second layer 24 is preferably deposited to the top surface 22 of the first layer 18 by the same screen printing process used to deposit the first layer 18. Once again, the screen printing process allows the thickness of the second layer 24 to be controlled, and allows the second layer 24 to be deposited in a pattern that matches exactly the pattern of the first layer 18. In the preferred embodiment, the second layer 24 is deposited with the same screen printing process as was used to deposit the first layer 18. This is preferred because using the same process reduces the number of different components needed to manufacture the device 10, and also insures that the pattern of the second layer 24 will match the pattern of the first layer 18. However, just as with the first layer 18, any method of depositing the compliant adhesive 16 that will allow the thickness of the second layer 24 to be controlled and will allow the adhesive 16 to be deposited in the desired pattern would be suitable.

Referring again to FIG. 3, immediately after the second layer 24 has been deposited to the top surface 22 of the first layer 18, and before the second layer 24 is cured, the sensor 20 is inserted into the second layer 24 of compliant adhesive 16. The sensor 20 is pressed into the second layer 24 until the sensor 20 rests essentially upon the top surface 22 of the first layer 18. As described above, the first layer 18 is deposited at a thickness approximately equal to a pre-determined distance 12 at which the sensor 20 must remain from the substrate 14.

When the sensor 20 is pressed into the second layer 24 of compliant adhesive 16, only a very thin portion 30 of the second layer 24 of compliant adhesive 16 remains between the sensor 20 and the top surface 22 of the first layer 18 of compliant adhesive 16. This very thin portion 30 of the second layer 24 that remains between the first layer 18 and the sensor 20 attaches the sensor 20 to the first layer 18. Although the sensor 20 does not rest directly on the top surface 22 of the first layer 18 of compliant adhesive 16, the thickness of the very thin portion 30 of the second layer 24 of compliant adhesive 16 is minimal to the pre-determined distance 12 that the sensor 20 must be spaced from the substrate 14. In other words, the thickness of the second layer 24 of compliant adhesive 16 is preferably not sufficient to affect the performance of the sensor 20. When the sensor 20 is attached onto the top surface 22 of the first layer 18 of compliant adhesive 16, the sensor 20 will automatically be spaced the appropriate distance 12 from the substrate 14. This allows the sensor 20 to be placed to the substrate 14 and insures that the appropriate distance between the substrate 14 and the sensor 20 is maintained without the use of any complicated gauging or measuring devices to insure accuracy. The screen print process insures accurate thickness of the first layer 18 of the compliant adhesive 16, and once the first layer 18 cures, the distance 12 between the top surface 22 of the first layer 18 and the substrate 14 is established, making the placement of the sensor 20 much less complicated and more accurate.

After the sensor 20 has been inserted into the second layer 24 of compliant adhesive 16 and rests upon the top surface 22 of the first layer 18 of compliant adhesive 16, the second layer 24 is then cured. Once the second layer 24 is cured, the sensor 20 is held firmly to the top surface 22 of the first layer 18, at the appropriate distance 12. Both the first layer 18 and the second layer 24 will allow slight relative movement between the sensor 20 and the substrate 14 to prevent any stresses from being transferred to the sensor 20 from the substrate 14.

The foregoing discussion discloses and describes one preferred embodiment of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. A method for attaching a sensing device to a substrate at a pre-determined distance from the substrate comprising:
   providing an adhesive;
   depositing a first layer of adhesive onto the substrate, the first layer comprising a plurality of deposits of the adhesive positioned at discreet locations on the substrate;
   curing the first layer of adhesive;
   depositing a second layer of adhesive directly onto the first layer of adhesive, the second layer comprising a plurality of deposits of adhesive positioned directly on top of the plurality of deposits of the first layer;
   inserting the sensing device into the second layer of adhesive; and curing the second layer of adhesive.

2. The method of claim 1 including the step of controlling the thickness of the first layer of adhesive such that the first layer of adhesive cures to a specified thickness.

3. The method of claim 2 wherein the sensing device is inserted into the second layer of adhesive until the sensing device contacts the cured first layer of adhesive, thereby attaching the sensing device to the substrate at a pre-determined distance from the substrate, and allowing fluid communication between the sensing device and the substrate.

4. The method of claim 3 wherein the first and second layers of adhesive are deposited by screen printing.

5. The method of claim 4 wherein the first and second layers of adhesive are placed in a pattern to provide adequate support for the sensing device.

* * * * *